United States Patent [19]

Shibasaki et al.

[11] Patent Number: 5,475,271
[45] Date of Patent: Dec. 12, 1995

[54] POWER SOURCE CONTROL SYSTEM FOR ELECTRONIC DEVICE AND EXPANSION UNIT CONNECTED THERETO

[75] Inventors: Kazuya Shibasaki; Yasuhiro Ohashi, both of Tokyo, Japan

[73] Assignee: Kabushiki Kaisha Toshiba, Kawasaki, Japan

[21] Appl. No.: 412,860

[22] Filed: Mar. 29, 1995

Related U.S. Application Data

[63] Continuation of Ser. No. 940,218, Sep. 8, 1992, abandoned.

[30] Foreign Application Priority Data

| Sep. 9, 1991 | [JP] | Japan | 3-229149 |
| Sep. 9, 1991 | [JP] | Japan | 3-229150 |
| Sep. 9, 1991 | [JP] | Japan | 3-229151 |

[51] Int. Cl.[6] ............................................. G06F 1/30
[52] U.S. Cl. ............................. 307/31; 307/86; 364/707; 395/750
[58] Field of Search ........................... 307/31, 85, 86, 307/64, 66, 23, 26, 150; 361/729, 730, 731, 733; 364/707; 340/825.07, 825.08, 825.52, 825.34, 693, 505; 439/488, 489; 395/800, 750, 325, 275; 365/226, 227

[56] References Cited

U.S. PATENT DOCUMENTS

| 4,195,344 | 3/1980 | Yamazaki | 364/232.7 |
| 4,698,770 | 10/1987 | Rattan et al. | 395/275 |
| 4,965,738 | 10/1990 | Bauer et al. | 320/39 |
| 5,097,388 | 3/1992 | Buist et al. | 361/729 |
| 5,164,652 | 11/1992 | Johnson et al. | 320/2 |
| 5,200,689 | 4/1993 | Interiano et al. | 320/37 |
| 5,239,495 | 8/1993 | Nanno et al. | 364/707 |
| 5,257,163 | 10/1993 | Buist et al. | 361/729 |
| 5,301,334 | 4/1994 | Horiuchi | 395/750 |

FOREIGN PATENT DOCUMENTS

| 0404588 | 12/1990 | European Pat. Off. . |
| 3833298A1 | 4/1990 | Germany . |
| 60-198617 | 8/1985 | Japan . |

OTHER PUBLICATIONS

Desk Station IV User's Manual, Toshiba Corporation, 1992.
Desktop Expansion Base Operations and Installation Guide, Compaq Computer Corporation, 1992.
U.S. patent application Ser. No. 08/086,462 to Sekine et al, filed Jul. 6, 1993.
Official Action (including translation) from German Patent Office dated Dec. 16, 1993.

Primary Examiner—William M. Shoop, Jr.
Assistant Examiner—Richard T. Elms
Attorney, Agent, or Firm—Finnegan, Henderson, Farabow, Garrett & Dunner

[57] ABSTRACT

A power source device of an expansion unit determines whether an electric device is connected to the expansion unit, and supplies an operating power source voltage CC to the electric device only when the electric device is connected to the expansion unit. Further, the power source device outputs a preset command to the electric device, and supplies a charging power source voltage B-CC to the electric device in accordance with device kind indicating information output from the electric device in response to the preset command. Also, when the power supply device of the expansion unit is in an abnormal state, the power supply device of the expansion unit detects the abnormal state, and outputs the electric device to a state signal representing the abnormal state and execute power source interruption processing of the power source device. In the electric device, power source interruption processing of a power source device of the electric device is performed in response to the state signal.

9 Claims, 6 Drawing Sheets

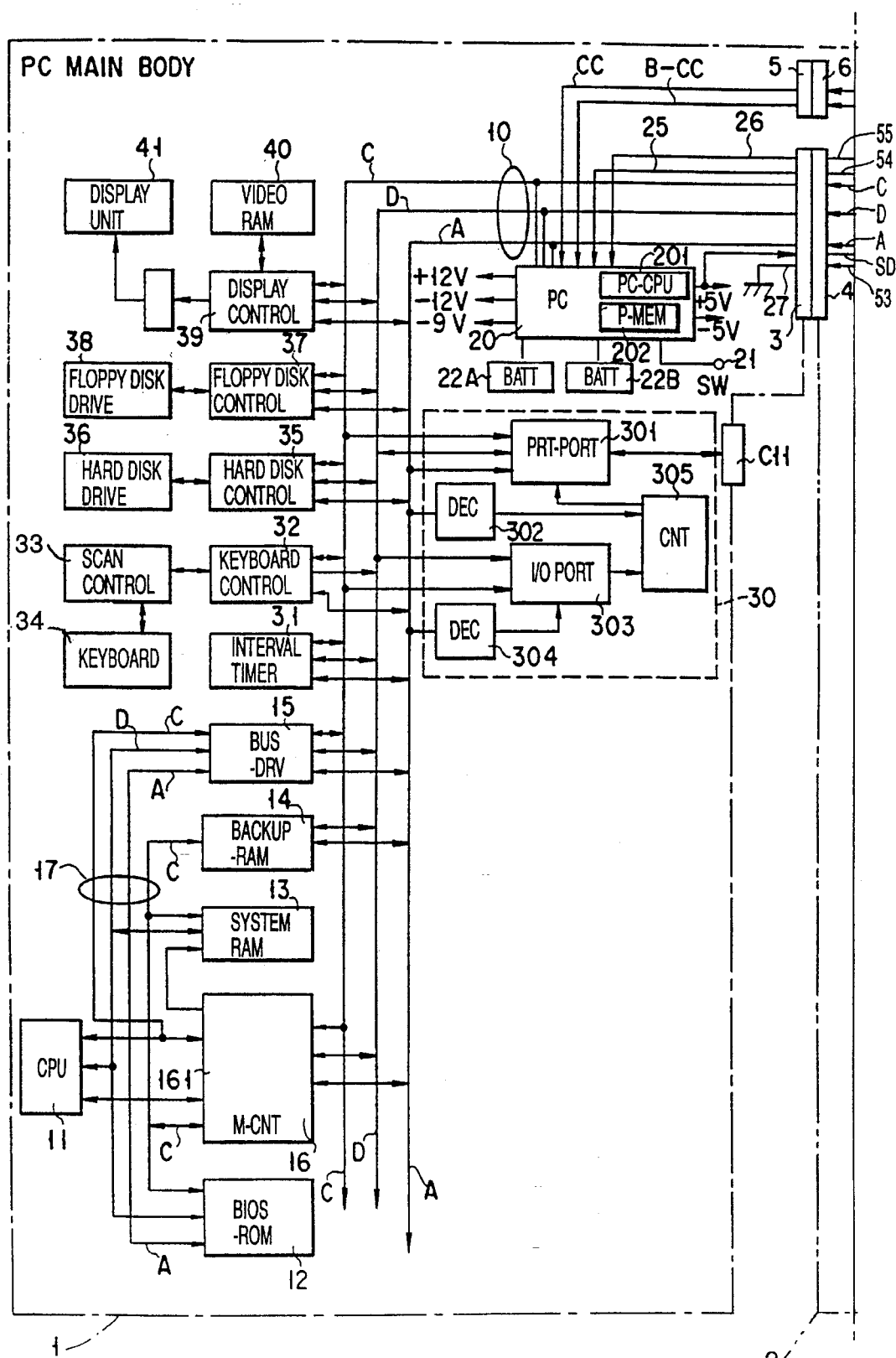
F I G. 1A

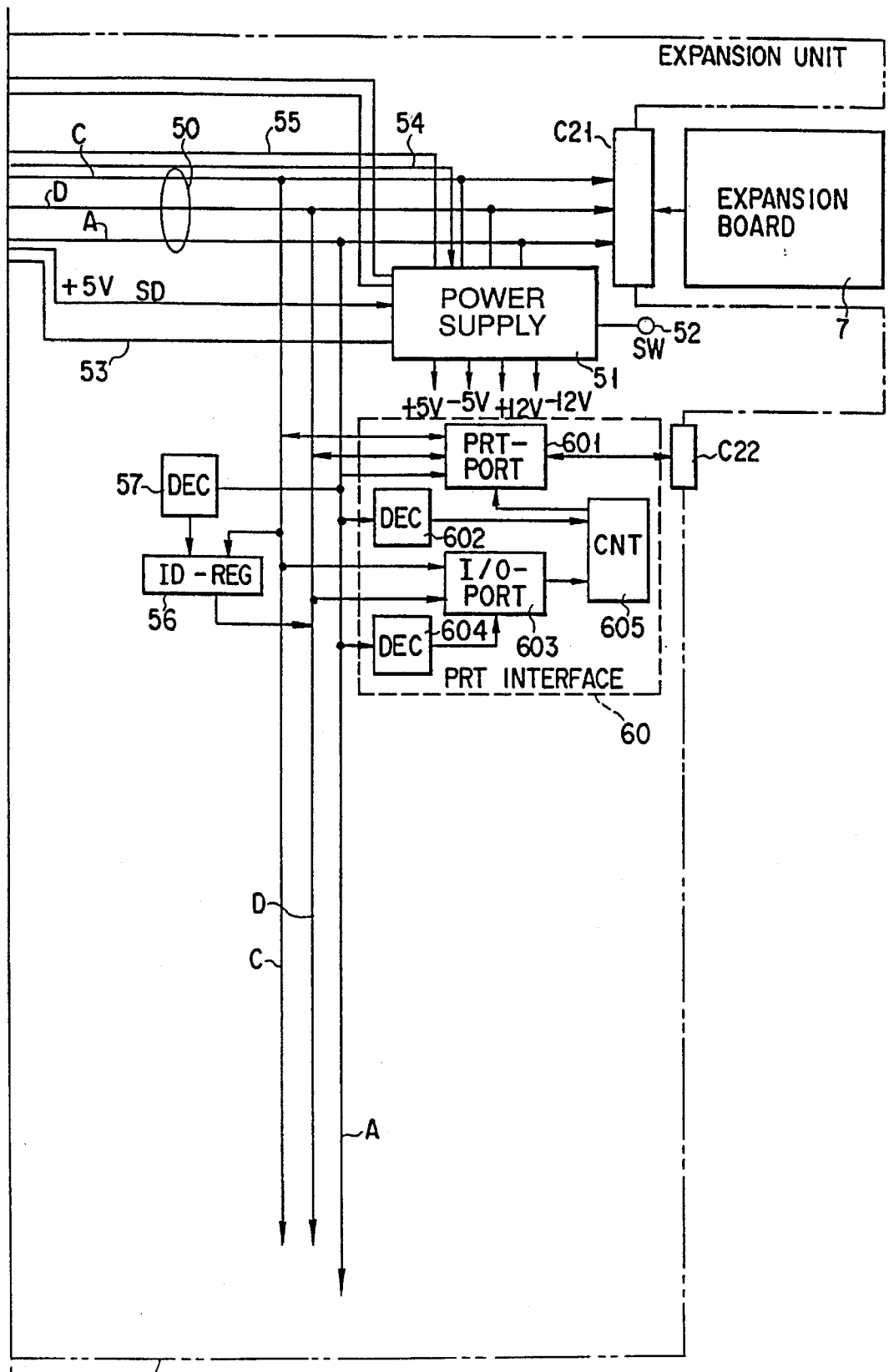
F I G. 1B

POWER SOURCE CONTROL SYSTEM FOR ELECTRONIC DEVICE AND EXPANSION UNIT CONNECTED THERETO

This application is a continuation, of application Ser. No. 07/940,218 filed Sep. 8, 1992, now abandoned.

BACKGROUND OF THE INVENTION

1. Field of the Invention

This invention relates to a power source control system for controlling the power supply to a system having an electronic device such as a personal computer and an expansion unit which is connected to the electronic device to expand the function of the electronic device and which has a power source independent from that of the electronic device.

2. Description of the Related Art

In recent years, portable computers such as lap-top type computers and book type computers have been widely used as small electronic devices which can be easily carried. This type of portable computer is formed with the function of the computer main body suppressed to minimum to enhance the portability thereof. Therefore, an expansion unit is provided separately from the computer main body to permit the computer main body to expand the function by connecting the computer to the expansion unit.

Power sources are independently provided for the computer main body and expansion unit, respectively. Generally, the expansion unit has a function of the A.C. adapter so as to supply a D.C. power to the computer main body. That is, the function expansion unit can be used to supply electric power necessary for charging and operating the computer main body when it is connected to the computer main body.

The expansion unit has a power source switch, and a preset electric power is supplied to the computer main body by turning on the switch to set the power source into the ON state. Since the expansion unit is operated to provide the expanded function of the computer main body whose function is to be expanded when it is connected to the computer main body, the power source switch will not be independently turned on to set the power source into the ON state. However, when the power source switch is turned on to set the power source into the ON state for any reason, it is generally difficult to recognize the ON state of the power source. For this reason, the ON state of the power source may be maintained for a long period of time even if the function expansion unit is not actually used, and in this period of time of the ON state, the power supply to the computer main body connected to the expansion unit is maintained. Thus, in the conventional expansion unit, the possibility that electric power will be uselessly consumed and the elements constructing the unit will be damaged is high. Further, a problem that an error will be caused by a sneak path of the power source at the time of connection or disconnection of the unit occurs.

In a case where the power source of the expansion unit is instantaneously interrupted or set into an abnormal state and an erroneous operation or the power-off occurs while the computer main body is connected to the expansion unit and operated, the computer main body cannot recognize the erroneous operation or power-off. For example, in a case where the expansion unit is set into an abnormal state and the power supply is interrupted when the computer main body is operated by the power supplied from the expansion unit, the computer can effect the normal operation since the computer main body has a battery provided therein and the power is supplied from the battery to the computer main body. Thus, since the computer main body performs the normal operation without recognizing the abnormal state of the expansion unit, the hang-up state may occur.

If the computer main body is set into the hang-up state for the above reason, the user of the computer cannot determine whether the hang-up is caused by the software, computer main body, expansion unit or function expanding elements in the expansion unit. For this reason, the user will use much time and labor to find out the cause of the hang-up. Generally, the cause cannot be found in the above condition and the user will have a deep distrust of the computer or the like.

When only the power source on the expansion unit side is interrupted, a sneak path for the current and voltage will be made from the computer main body side via a signal line including the ground (GND) line. Therefore, when the power source of the expansion unit is turned on again, a latch-up phenomenon occurs in the driver of the expansion unit to damage the parts or cause an erroneous operation.

The computer main body generally has a battery provided therein and can be operated by the battery. In the computer having the battery provided therein, the built-in battery can be removably attached, and in some kinds of computers, different types of built-in batteries having different current capacities can be selectively loaded according to the application.

In some cases, only one kind of computer can be connected to the expansion unit, but recently, an expansion unit to which different kinds of computers can be connected is provided when different kinds of computers are used by using the above type of expansion unit and if optimum currents and voltages required for charging the built-in batteries of the respective computers are equal to each other, it is not necessary to adjust the current and voltage supplied from the expansion unit to the computer. However, when currents and voltages required for charging the built-in batteries of the respective computers are different from each other, it is necessary to adjust the current and voltage supplied from the expansion unit.

For example, when a current and voltage required for charging the built-in battery of a computer connected to the expansion unit are respectively different from the current and voltage supplied from the expansion unit, the battery may be excessively charged or an excessively long time is required for charging the battery.

SUMMARY OF THE INVENTION

A first object of this invention is to provide a highly reliable power source control system which can prevent the power from being uselessly consumed in an expansion unit when it is not connected to an electronic device.

A second object of this invention is to provide a highly reliable power source control system capable of preventing occurrence of the hang-up, breakdown and erroneous operation of an electronic device which may be caused when the power source of the expansion unit is set into the abnormal state.

A third object of this invention is to provide a highly reliable power source control system which can supply an adequate voltage and current to any one of electronic devices having different power sources required for charging batteries when one of them is selectively connected an expansion unit.

According to a first aspect of this invention, in an expansion unit having a power source device and connected to an electronic device having a power source device, for supplying electric power to the power source device of the electronic device, the power source device of the expansion unit comprises detection means for detecting the state of connection between the function expansion unit and the electronic device; and power supply control means for enabling the power source device of the expansion unit so as to permit electric power to be supplied from the expansion unit to the electronic device only when the detection means detects that the expansion unit is connected to the electronic device.

According to a second aspect of this invention, in a power source control method for an expansion unit having a power source device and connected to an electronic device having a power source device, for supplying electric power generated from the power source device thereof to the power source device of the electronic device, the power source control method for the expansion unit comprises a step (a) of detecting the state of connection between the expansion unit and the electronic device; and a step (b) of supplying electric power generated from the power source device of the expansion unit to the power source device of the electronic device when it is detected in the step (a) that the expansion unit is connected to the electronic device.

According to a third aspect of this invention, in a system including an expansion unit having a power source device and connected to an electronic device having a power source device, for supplying electric power generated from the power source device thereof to the power source device of the electronic device, the power source device of the electronic device includes storage means provided in the power source device, for storing kind information indicating the kind of the electronic device; and the power source device of the expansion unit includes recognizing means provided in the power source device, for recognizing the kind information stored in the storage means, and power supply control means for controlling the supply of electric power generated from the power source device of the expansion unit to the electronic device according to the kind information recognized by the recognizing means.

According to a fourth aspect of this invention, a power source control method for a system including an expansion unit having a power source device and connected to an electronic device having a power source device to supply electric power generated from the power source device thereof to the power source device of the electronic device comprises a step (a) of recognizing kind information indicating the kind of the electronic device and stored in the power source device of the electronic device by means of the power source device of the expansion unit; and a step (b) of controlling the supply of electric power generated from the power source device of the expansion unit to the electronic device according to the kind information recognized in the step (a).

According to a fifth aspect of this invention, in a system including an expansion unit having a power source device and connected to an electronic device having a power source device, for supplying electric power generated from the power source device thereof to the power source device of the electronic device, the system comprises power source abnormal state detection means for detecting the abnormal state of the power source device of the expansion unit and generating power source abnormal signals; first power source interruption means for forcedly interrupting the power source device of the electronic device according to one of the power source abnormal signals; and second power source interruption means for forcedly interrupting the power source device of the expansion unit according to the other power source abnormal signal.

According to a sixth aspect of this invention, a power source control method for a system including an expansion unit having a power source device and connected to an electronic device having a power source device to supply electric power generated from the power source device thereof to the power source device of the electronic device comprises a step (a) of detecting the abnormal state of the power source device of the expansion unit; a step (b) of generating a power source abnormal signal in response to detection of the abnormal state of the power source in the step (a); a third step (c) of forcedly interrupting the power source device of the electronic device according to the power source abnormal signal generated in the step (b); and a step (d) of forcedly interrupting the power source device of the expansion unit according to the power source abnormal signal generated in the step (b).

The above objects can be attained with the above constructions. That is, it is possible to provide a highly reliable power source control system which can prevent the electric power from being uselessly consumed when an electronic device is not connected thereto, prevent occurrence of the hang-up, breakdown and erroneous operation of the electronic device which may be caused when the power source of the expansion unit is set into the abnormal state, and supply an adequate voltage and current to the electronic device connected thereto.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1A and 1B are block diagrams showing the constructions of a personal computer (PC) and expansion unit to which this invention is applied and which are connected to each other;

DETAILED DESCRIPTION OF THE PREFERRED EMBODIMENTS

There will now be described an embodiment of this invention with reference to the accompanying drawings.

Figure 1C:
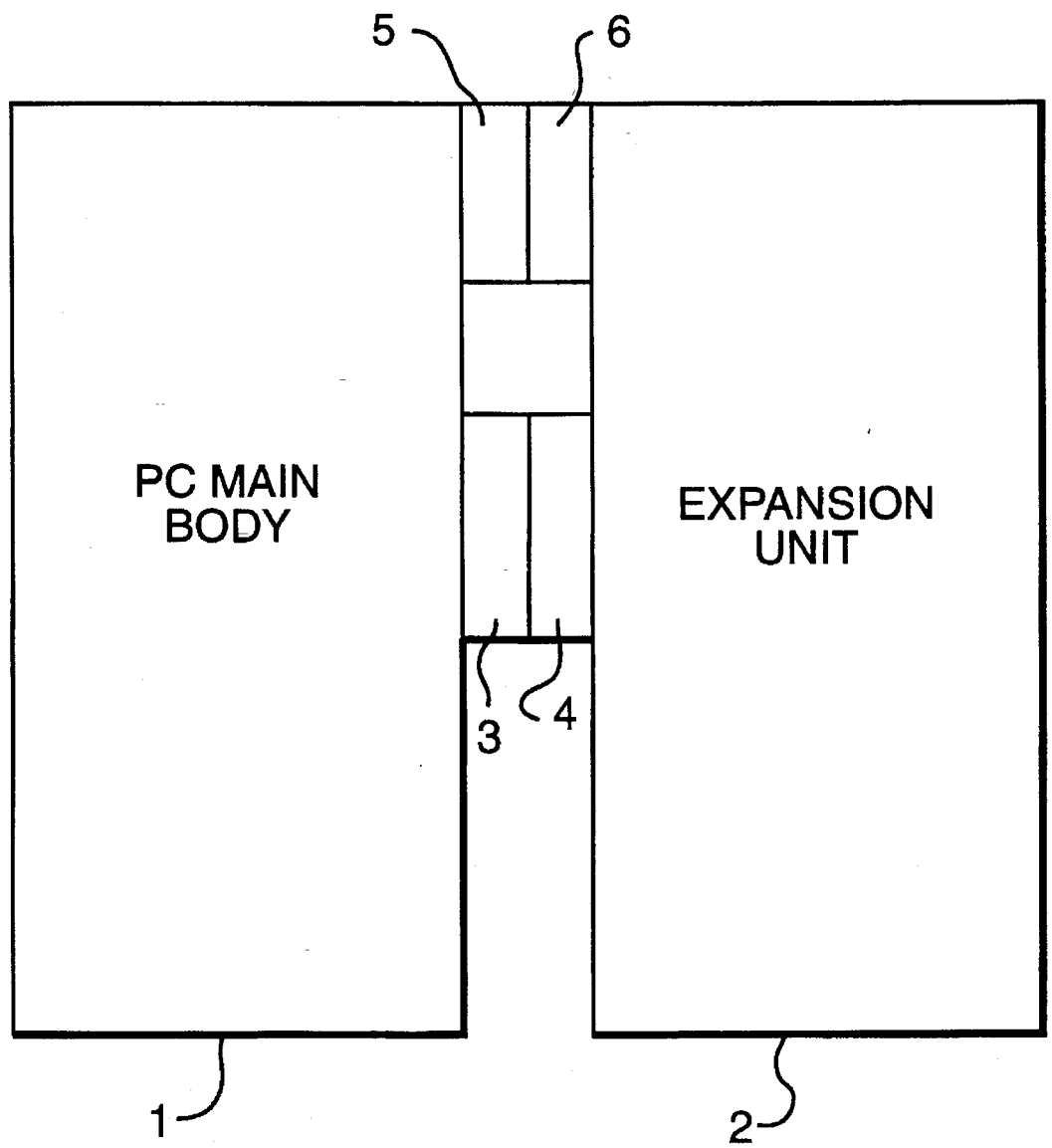
FIG. 1C is a block diagram showing the relationship between the personal computer (PC) shown in FIG. 1A and the expansion unit shown in FIG. 1B.

FIGS. 1A and 1C show the constructions of a personal computer (PC) 1 and an expansion unit 2 which are connected to each other. The personal computer main body 1 is a lap-top type computer which can be driven by a battery. Data communication can be effected between the personal computer main body 1 and the expansion unit 2 by connecting a connector 3 of the personal computer main body 1 to a connector 4 of the expansion unit 2. When the expansion unit 2 is not used, a D.C. output power source voltage (CC, B-CC) of the exclusive-use power source adapter is applied to a power source input terminal 5 of the personal computer main body 1 as the operating power source voltage and charging power source voltage. Further, when the expansion unit 2 is used, it is plugged into a power source output plug 6 of the expansion unit 2 and a D.C. output power source voltage (CC, B-CC) created in the expansion unit 2 is applied to the power source input terminal as the operating power source voltage and charging power source voltage. An expansion board 7 can be freely connected to an expanding connector unit C21 of the expansion unit 2.

The personal computer main body 1 includes constituents 10 to 43 and C11. The components 11 to 17 and 31 to 43 are directly or indirectly connected to the system bus 10.

The CPU 11 controls the operation of the entire portion of the system. Fixed programs such as the initial reliability test (IRT) and basic input output system (BIOS) are stored in the system firm ware ROM (BIOS-ROM) 12. A random access memory (SYSTEM-RAM) 13 constitutes a main memory and is used to store to-be-processed programs and data. A back-up RAM 14 is an area for storing necessary data at the time of interruption of the power source and is applied with a backup power source voltage in the power source interruption state. A bus driver (BUS-DRV) 15 is connected between a CPU bus 17 and the system bus 10 to permit data transfer between the above buses. A memory controller (M-CNT) 16 controls access to the memories 12, 13 and 14.

An intelligent power supply (PS) 20 includes a power control CPU (PC-CPU) 201 and a memory (M-MEM) 202 which stores data indicating the kinds of personal computer bodies and is applied with a D.C. power source voltage (CC, B-CC) which is supplied from the power source adapter or expansion unit 2 as the operating power source voltage or charging power source voltage. The PS 20 creates various kinds of internal power source voltages (in this embodiment, +12 V, −12 V, +9 V, +5 V and −5 V) based on the D.C. power source voltage CC. A switch 21 is operated to selectively supply the above internal power source voltages. In the PS 20, a power source voltage +5 V for the internal operation is supplied to the expansion unit 2 via the connectors 3 and 4 as an operation determining signal (SD). If the PC-CPU 201 receives a preset command (COM) from the expansion unit 2 via a line 25 when the expansion unit 2 is connected, it sends back the kind indicating data to the expansion unit 2 via the line 25. Further, when the PC-CPU 201 receives a power source abnormal signal (AD) from the expansion unit 2 via a line 26, it effects a predetermined power source interruption process. The PC-CPU 201 is designed to effect the operation of detecting the operation of the switch 21, for example, when the PS 20 of the personal computer main body 1 is set in the OFF state. The PS 20 is connected to packed type main batteries (B-A, B-B) 22A and 22B which can be removably attached to the personal computer main body 1 and which are formed of rechargeable batteries. When the PS 20 is not supplied with a power source voltage from the power source input terminal 5, one of the batteries 22A and 22B is selected as an operative battery (power source voltage supplying battery) under the control of the PS 20, and when the battery is discharged to the minimum permissible voltage level, the other battery is selected as an operative battery.

A printer (PRT) interface circuit 30 is connected between the system bus 10 and the printer connector C11 so as to permit data transfer with respect to a device such as a floppy disk drive (FDD) or a printer (PRT) connected to the printer connector C11. The printer interface circuit 30 includes a printer port (PRT-PORT) 301 for permitting control signals and data to be transferred with respect to an external device such as a printer connected to the printer connector C11, an address decoder (DEC) 302 for detecting the address of the printer port, an input/output port (I/O-PORT) 303 for inputting information used for controlling the printer port 301, an address decoder (DEC) 304 for detecting the address of the I/O port, and a control circuit (CNT) 305 for controlling the printer port 301 according to control information received by the input/output port 303 and a chip select signal received at the time of address detection of the address decoder 302.

Further, the personal computer main body 1 includes an interval timer (PIT: Programmable Interval Timer) 31 which can be set by the program, keyboard controller (KBC) 32, scan controller (SC) 33, keyboard (KB) 34, hard disk controller (HDC) 35, hard disk drive (HDD) 36, floppy disk controller (FDC) 37, floppy disk drive (FDD) 38, display controller (DISP-CNT) 39, video RAM (VRAM) 40 applied with a back-up voltage, and display unit (DISP) 41. In order to simplify the drawing, components such as a DMA controller for effecting the direct memory access (DMA), interruption controller, timepiece module (Real-Time Clock), expanded RAM and card slot for RAM card are omitted in the drawing.

The expansion unit 2 includes constituents 50 to 57 and 60. The system bus 50 on the expansion unit side is connected to the system bus 10 of the personal computer main body 1 via the connectors 3 and 4.

The intelligent power supply (PS) 51 is connected to the power source switch 52 and creates internal operation power source voltages (in this embodiment, +12 V, −12 V, +5 V and −5 V) of the expansion unit 2 and an operating power source voltage CC and charging power source voltage B-CC supplied to the personal computer main body 1. The PS 51 is connected to the connector 4 via the line 53 so as to determine whether or not the personal computer main body 1 is connected thereto, and supplies the operating power source voltage CC and charging power source voltage B-CC to the PS 20 in the personal computer main body 1 via the power source output terminal 6 and power source input terminal 5 when it is detected that the personal computer main body is connected. Further, it has a power source output controlling function for inhibiting the output of the operating power source (+12 V, −12 V, +5 V and −5 V) in the internal portion of the unit until the operation determining signal (SD) of +5 V is received via the connectors 3 and 4. It further has a function of adjusting the charging power source voltage B-CC to an adequate voltage and current by receiving kind indicating information (MD) from the PS 20 on the personal computer main body 1 side via the line 54. Also, it has a function of supplying a power source abnormal signal (AD) to the personal computer main body 1 via the line 55 and then effecting a predetermined power source interruption process when an abnormal accident occurs in the operating power source voltage supplied to the internal portion of the unit and the operating power source voltage and charging power source voltage supplied to the personal computer main body 1.

The ID register (ID-REG) 56 is connected to the system bus 50 on the expansion unit side and stores inherent device kind indicating information into the expansion unit 2. The address decoder (DEC) 57 detects the address of the ID-REG 56.

The printer connector C22 can be used instead of the connector C11 mounted on the personal computer main body 1. When the expansion unit 2 is used and docked with the personal computer main body 1 on the rear surface side thereof, the connector C11 of the personal computer main body 1 cannot be physically used at the time of connection (docking) since the connector C11 is provided on the rear surface of the personal computer main body 1. Therefore, the connector C22 of the expansion unit 2 is provided so as to be used at this time. The specific explanation of this matter is made in U.S. patent application Ser. No. 708,730.

The printer interface circuit 60 on the expansion unit 2 side is connected between the expanding side system bus 50 and the expanding side printer connector C22 and permits information transfer with respect to a device connected to the expanding side printer connector C22 instead of the printer connector C11 of the personal computer main body 1. The printer interface circuit 60 includes a printer port (PRT-PORT) 601 for effecting the control signal and data transfer with respect to an external device such as a printer (PRT) connected to the printer connector C22, an address decoder (DEC) 602 for detecting the address of the printer port 601, an input/output port (I/O-PORT) 603 for inputting information used for controlling the printer port 601, an address decoder (DEC) 604 for detecting the address of the I/O port 603, and a control circuit 605 for controlling the printer port 601 according to control information received from the input/output port 603 and a chip select signal received at the time of address detection of the address decoder 602.

Figure 2:
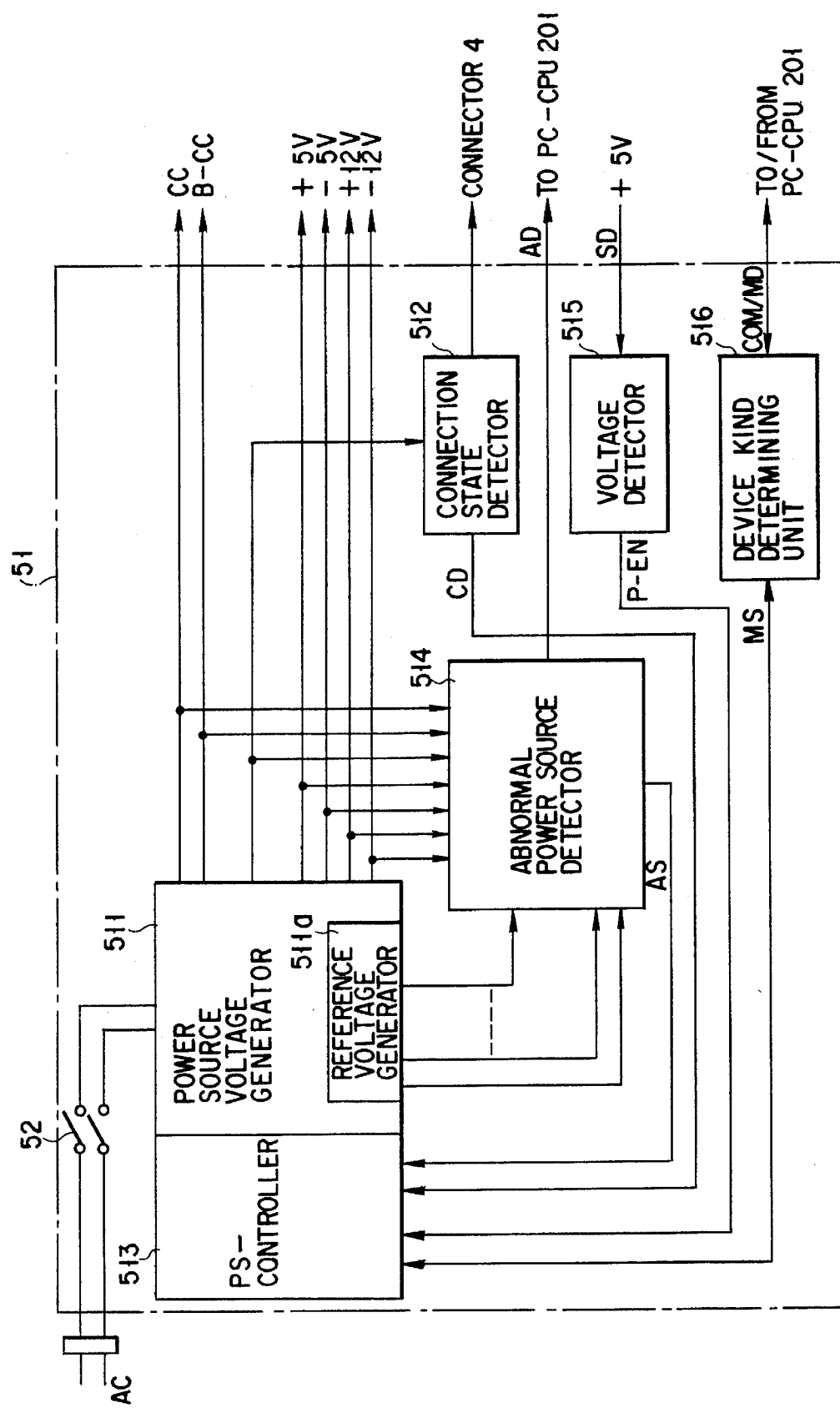
FIG. 2 is a block diagram showing the function block of an intelligent power supply (PS) in the expansion unit shown in FIG. 1.

FIG. 2 is a block diagram showing the functional construction of the intelligent power supply (PS) 51 in the expansion unit 2.

The PS 51 is supplied with an A.C. power source voltage from the exterior by turning ON the power source switch 52. A power source voltage generator 511 creates an operating power source voltage CC supplied to the personal computer main body 1, battery charging power source voltage B-CC, operating power source voltages (+12 V, −12 V, +5 V, −5 V) supplied to the internal portion of the expansion unit, and a power source voltage Va supplied to a connection state detector 512 for determining whether the personal computer main body 1 and the expansion unit 2 are connected to each other or not based on the input A.C. power source voltage under the control of a PS-controller 513. The thus created power source voltages (CC, B-CC, Va, +12 V, −12 V, +5 V, −5 V) are supplied to the respective components and to an abnormal power source detector 514.

The power source voltage generator 511 further includes a reference voltage generator 511a for generating reference voltages in addition to the above power source voltage creating circuit for the output power source voltages. The reference voltages generated by the reference voltage generator 511a are threshold voltages with respect to the voltages (CC, B-CC, Va, +12 V, −12 V, +5 V, −5 V) created by the power source voltage generator 511. The reference voltages used as the threshold values are supplied to the abnormal power source detector 514.

The abnormal power source detector 514 is constructed by a comparator and an OR circuit and compares the voltages (CC, B-CC, Va, +12 V, −12 V, +5 V, −5 V) created by the power source voltage generator 511 and supplied to the respective components with the respective reference voltages created by the reference voltage generator 511a. when any one of the voltages exceeds the corresponding reference voltage (threshold voltage), a power source abnormal signal (AD) is supplied to the PS 20 of the personal computer main body 1 and a power source abnormal signal (AS) is supplied to the PS-controller 513.

Figure 3:
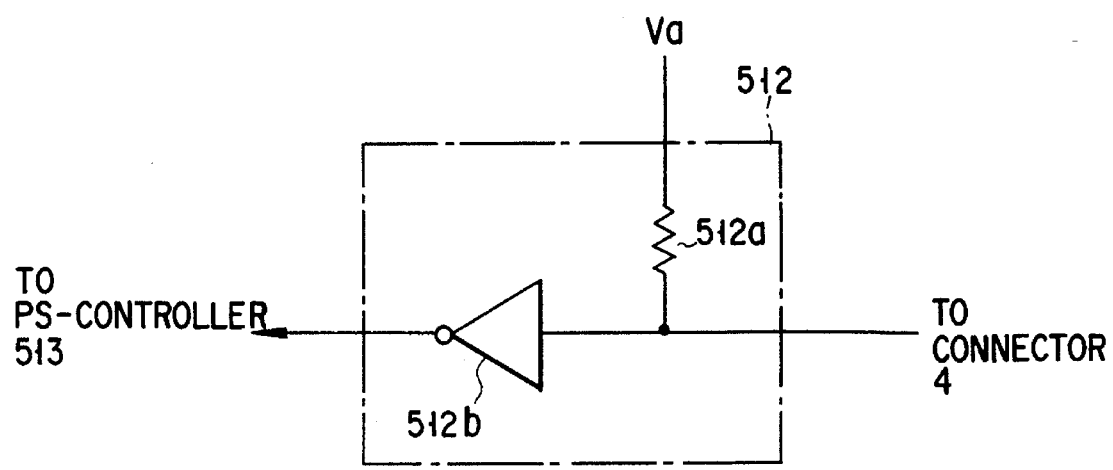
FIG. 3 is a circuit diagram showing an example of the circuit construction of a connection state detector shown in FIG. 2.
Figure 4:
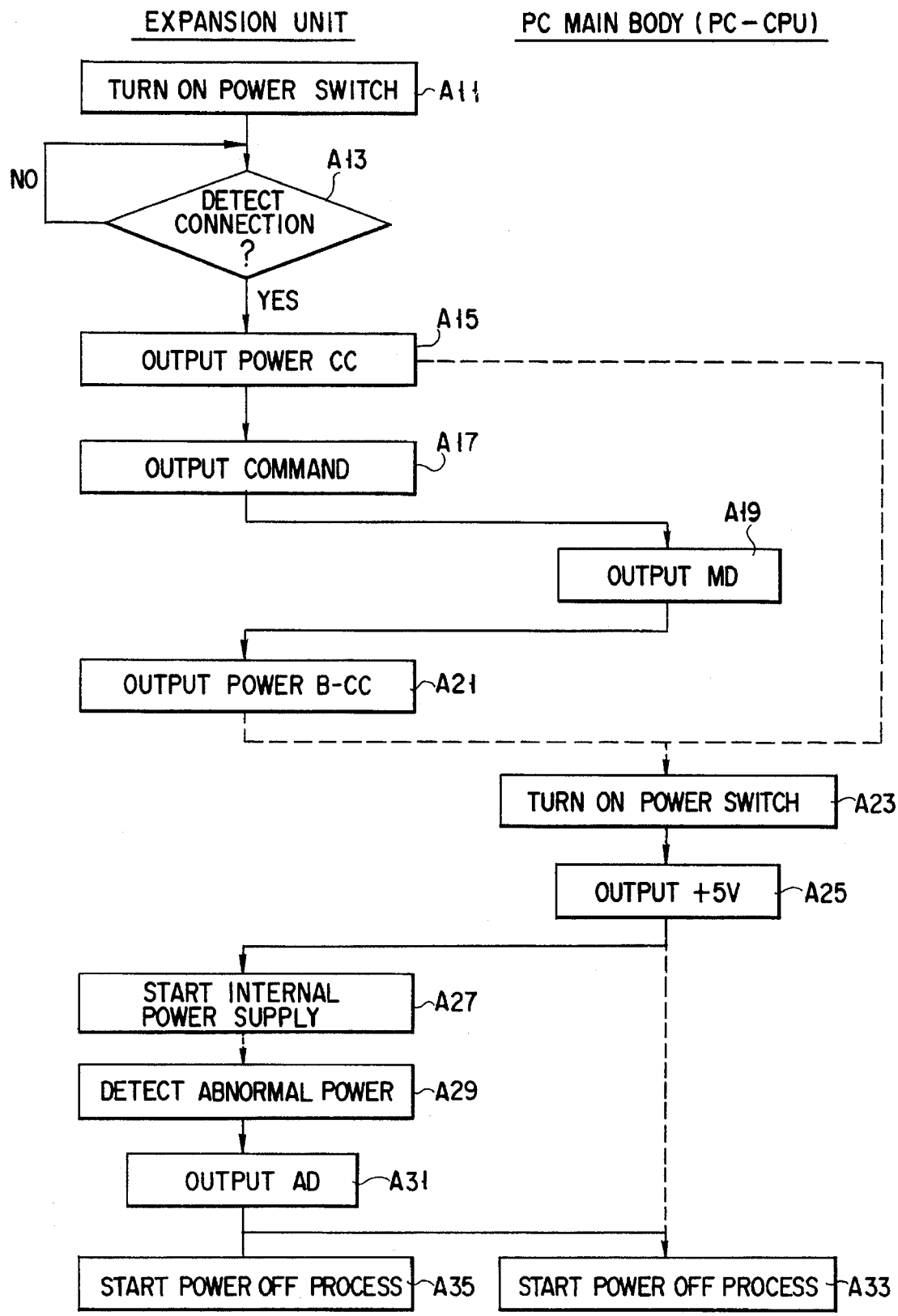
FIG. 4 is a flowchart schematically illustrating the operation of this invention in the personal computer main body and expansion unit shown in FIG. 1, and particularly, the relation between the operations of the personal computer main body and expansion unit.

The connection state detector 512 has a circuit construction as shown in FIG. 3, for example. The power source voltage Va supplied to the connection state detector 512 is applied to one end of a resistor 512a. The other end of the resistor 512a is connected to a connector C4 via a line 53 and to a driver 512b. An output terminal of the driver 512b is connected to the PS-controller 513. The connection state detector 512 detects the state of connection between the personal computer main body 1 and the expansion unit 2, and outputs a connection state signal (CD) to the PS-controller 513 when the personal computer main body 1 and the expansion unit 2 are connected to each other.

The PS 51 further includes a voltage detector 515 and a device kind determining unit 516. When the voltage detector 515 receives an operation determining signal (SD) of +5 V from the PC power source circuit 20 of the personal computer main body 1 via the connectors 3 and 4, it outputs a power source enable signal (P-EN) to the PS-controller 513 at the time of detection of the signal.

The device kind determining unit 516 transmits a preset command (COM) to the PC-CPU 201 of the personal computer main body 1 under the control of the PS-controller 513 and receives a device kind information signal (MD) corresponding to the command to determine the kind of the personal computer main body 1 based on the received signal. The device kind determining unit 516 supplies a signal (MS) corresponding to the determined device kind to the PS-controller 513.

The PS-controller 513 controls the power source voltage generator 511 according to respective signals supplied from the connection state detector 512, abnormal power source detector 514, voltage detector 515 and device kind determining unit 516 as will be described later.

Next, the operation of the above embodiment is explained with reference to FIGS. 1 through 4.

First, the operation of controlling the power source voltage supply of the operating power source voltage CC and charging power source voltage B-CC which are supplied from the expansion unit 2 to the personal computer main body 1.

When the switch 52 of the expansion unit 2 is operated and an input of the external A.C. power source voltage is made active (FIG. 1, step A11), a preset internal process in the power source voltage supplying circuit (PS) 51 in the expansion unit 2 is effected. The power source voltage generator 511 of the PS 51 creates preset voltages (CC, B-CC, Va, +12 V, −12 V, +5 V, −5 V) from an input external A.C. power source voltage (AC). The voltage Va among the preset voltages is output and applied to the connection state detector 512.

The connection state detector 512 has a construction shown in FIG. 3 as an example of the above circuit construction and detects whether the personal computer main body 1 is connected to the expansion unit 2 or not (step A13). When the personal computer main body 1 is not connected to the expansion unit 2, the voltage Va applied to the connection state detector 512 is applied to the driver 512b via the resistor 512a. As a result, a high level signal is supplied from the driver 512b to the PS-controller 513. However, when the personal computer main body 1 is connected to (docked with) the expansion unit 2, the line 53 is connected to the line 27 (FIG. 1A) on the personal computer main body 1 side via the connectors 3 and 4. The line 27 is connected to the ground (GND). Therefore, when the personal computer main body 1 is connected to the expansion unit 2, no voltage is applied to the driver 512b. As a result, when the personal computer main body 1 is connected to the expansion unit 2, a connection state indicating signal (CD) of low level is supplied from the connection state detector 512 to the PS-controller 513.

The PS-controller 513 controls the power source voltage generator 511 to supply the power source voltage to the personal computer main body 1 in response to the connection state indicating signal (SD). That is, the operating power source voltage CC is supplied from the power source voltage generator 511 to the PS 20 on the personal computer main body 1 side via the power source output terminal 6 and power source input terminal 5 (Step A15). Further, when the personal computer main body 1 is not connected to the expansion unit 2, the power source voltage generator 511 supplies only the voltage Va to the connection state detector 512.

The PS-controller 513 permits the operating power source voltage CC to be supplied from the power source voltage generator 511 in response to the connection state indicating signal (SD) and causes a preset command (COM) to be supplied to the personal computer main body 1 via the device kind determining unit 516 (step A17). The command (COM) is supplied to the PS 20 via the line 54 in the expansion unit 2, connectors 4 and 3, and the line 25 in the personal computer main body 1. The PC-CPU 201 reads out data corresponding to the personal computer main body 1 from the M-MEM 202 in response to the command (COM) and supplies the readout data to the PS 51 on the expansion unit 2 side as device kind indicating information (MD) (step A19). The device kind indicating information (MD) is supplied to the device kind determining unit 516 in the PS 51 via the line 25 in the personal computer main body 1, connectors 3 and 4, and line 54 in the expansion unit 2. The device kind determining unit 516 determines the kind of the personal computer main body 1 which is connected to the expansion unit based on the device kind indicating information (MD) and supplies a signal (MS) corresponding to the determined device kind to the PS-controller 513. The PS-controller 513 controls the power source voltage generator 511 according to the received signal (MS). As a result, the charging power source voltage B-CC which is an adequate current and voltage suitable for charging the battery used for the personal computer main body 1 of the determined kind is supplied from the power source voltage generator 511 to the PS 20 via the power source output terminal 6 and power source input terminal 5 (step A21). The PS 20 creates various power source voltages supplied to the internal portions of the personal computer main body 1 based on the operating power source voltage B-CC supplied from the power source input terminal 5 and charges the main batteries (B-A, B-B) 22A and 22B by use of the charging power source voltage B-CC.

As described above, since the operating power source voltage CC and charging power source voltage B-CC can be supplied only when the personal computer main body 1 is connected to the expansion unit 2, the electric power can be prevented from being uselessly consumed and occurrence of abnormal accident in the components of the device due to continuous energization over a long period of time can be prevented. In the above embodiment, a case wherein the operating power source voltage CC and charging power source voltage B-CC supplied to the personal computer main body 1 are controlled is explained as an example, but it is also possible to control the power source voltage in the expansion unit 2 and control the power source voltages for the components other than those described in the above embodiment and the external device.

Further, with the above construction and operation, an adequate voltage and current can always be supplied in the battery charging operation even when any one of devices of different kinds having batteries with different capacities is connected to a single expansion unit. In the above embodiment, the operation of controlling supply of the power source voltage for charging the battery is explained, but the operation of controlling supply of the operating power source voltage and/or current used for other purposes can be effected. Further, in the above embodiment, since the charging power source voltage is created in the PS 51 of the expansion unit 2, the circuit components which are normally provided in the personal computer main body 1 can be removed, thus making it possible to reduce the size of the personal computer main body 1.

The adequate charging current controlling operation can be effected by giving information on the charging state of the battery of the personal computer main body 1 to the expansion unit.

Next, the operation effected when the personal computer main body 1 is connected to the expansion unit 2 and if the power source switch 21 of the personal computer main body 1 is operated to set the power source into the ON state (step A23) is explained.

When the power source switch 21 is operated to set the power source of the personal computer main body 1 into the ON state, the PS 20 creates and supplies various voltages (+12 V, −12 V, −9 V, +5 V, −5 V) as operating voltages of the internal portion of the personal computer main body 1 based on the operating power source voltage CC. At this time, the voltage of +5 V is applied to the internal portion of the personal computer main body 1 and to the internal portion of the expansion unit 2 via the connectors 3 and 4 (step A25).

The voltage of +5 V is applied to a voltage detector 515 in the PS 51 as an operation determining signal (SD). When receiving the operation determining signal (SD), the voltage detector 515 outputs a power source enable signal (P-EN) to the PS-controller 513. The PS-controller 513 controls the power source voltage generator 511 in response to the power source enable signal (P-EN) so that the power source voltage generator 511 may supply various operating voltages (+5 V, −5 V, +12 V, −12 V) to the internal portion of the expansion unit 2 (step A27).

Thus, supply of the various operating voltages to the internal portion of the expansion unit 2 is controlled by turning ON or OFF the switch 21 of the personal computer main body 1.

Next, the processing operation effected when an abnormal accident occurs in the power source of the expansion unit 2 while the personal computer main body 1 is connected to (docked with) the expansion unit 2 is explained.

When the power source switch 52 of the expansion unit 2 is operated to set the power source of the expansion unit 2 into the ON state, a power source voltage is output from the power source voltage generator 511 irrespective of the ON/OFF state of the power source of the personal computer main body 1.

The abnormal power source detector 514 compares the various power source voltages generated from the power source voltage generator 511 with the respective reference voltages (threshold voltages) generated from the reference voltage generator 511a and corresponding to the various power source voltages (CC, B-CC, Va, +12 V, −12 V, +5 V, −5 V). For example, if the reference voltage corresponding to the voltage of +12 V is set to +6 V and when the power source voltage becomes lower than +6 V, then the abnormal power source detector 514 determines that the power source is set into the abnormal condition. The reference voltage +6 V may also be used as the reference voltage for the power source voltage of −12 V. This can be attained by inverting the positive and negative input terminals of the comparator used in the abnormal power source detector 514.

When an abnormal voltage is detected in the above comparing operation (step A29), the abnormal power source detector 514 outputs a power source abnormal signal (AD) to the personal computer main body 1 and a power source abnormal signal (AS) to the PS-controller 513 (step A31).

The power source abnormal signal (AD) is supplied to the PC-CPU 201 of the PS 20 via the line 55 of the expansion unit 2, connectors 4 and 3, and the line 26 in the personal computer main body 1. The PC-CPU 201 effects a preset power source interruption process in response to the power source abnormal signal (AD) (step A33).

The PS-controller 513 controls the power source voltage generator 511 in response to the power source abnormal signal (AS) and effects a preset power source interruption process (step A35).

As described above, when the power source of the expansion unit 2 is set into the abnormal condition, the personal computer main body 1 can be prevented from being hung up and the user can be informed of occurrence of the power source abnormal accident. Further, occurrence of erroneous operation and breakdown caused by a roundabout current or the like can be prevented.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An expansion unit having a power supply means and a connector to connect the expansion unit with a computer, comprising:

a switch;

means for detecting whether the expansion unit is connected with the computer in response to an ON operation of said switch; and power supply control means for enabling the power supply means to supply electric power to the computer only when said detecting means detects that the expansion unit is connected to the computer.

2. An expansion unit according to claim 1, wherein the computer has one or more batteries and the power supply means supplies an operating power to the computer and a charging power to said one or more batteries.

3. An expansion unit according to claim 1, wherein said detecting means creates and outputs a connection indicating signal to said power supply control means when detecting that the expansion unit and the computer are connected to each other; and said power supply control means enables the power supply means in response to a signal supplied from said detecting means.

4. A power supply control method for an expansion unit having a switch, a power supply means, and a connector to connect the expansion unit with a computer, comprising the steps of:

(a) detecting whether the expansion unit is connected with the computer in response to an ON operation of the switch; and (b) supplying electric power generated from the power supply means to the computer when it is detected that the expansion unit and the computer are connected to each other.

5. A method according to claim 4, wherein said detecting step includes creating a signal corresponding to the detected connection between the expansion unit and the computer; and said supplying step includes controlling the supply of an operating power created by the power supply means to the computer according to the signal created in said detecting step.

6. An expansion unit removably connected to a portable computer, comprising:

a power supply for supplying power to the portable computer;

a detector for detecting whether the portable computer is connected to the expansion unit; and a controller for preventing the power supply from supplying power to the portable computer when the detector detects that the portable computer is not connected to the expansion unit.

7. An expansion unit removably connected to a portable computer, comprising:

a power switch;

a power supply for supplying a first power and a second power, the first power being supplied in response to the power switch;

a detector, supplied with the first power, for detecting whether the portable computer is connected to the expansion unit; and a controller for permitting the power supply to supply the second power to the portable computer when the detector detects that the portable computer is connected to the expansion unit.

8. A power supply control method for an expansion unit removably connected to a portable computer, the expansion unit including a power switch, a power supply supplying a first power and a second power, and a detector for detecting whether the portable computer is connected to the expansion unit, comprising the steps of:

activating the power switch;

supplying, in response to the activating step, the first power to the detector;

detecting whether the portable computer is connected to the expansion unit; and permitting, in response to the detecting step, the power supply to supply the second power to the portable computer.

9. A power supply control method for an expansion unit removably connected to a portable computer, the expansion unit including a power supply supplying a first power and a second power and a detector detecting whether the portable computer is connected to the expansion unit, comprising the steps of:

supplying the first power to the detector;

detecting whether the portable computer is connected to the expansion unit; and preventing the power supply from supplying the second power to the portable computer when the detecting step detects that the portable computer is not connected to the expansion unit.

* * * * *